United States Patent
Adefris et al.

(10) Patent No.: US 6,319,108 B1
(45) Date of Patent: Nov. 20, 2001

(54) METAL BOND ABRASIVE ARTICLE COMPRISING POROUS CERAMIC ABRASIVE COMPOSITES AND METHOD OF USING SAME TO ABRADE A WORKPIECE

(75) Inventors: Negus B. Adefris, Burnsville, MN (US); Carl P. Erickson, Deer Park, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/350,580

(22) Filed: Jul. 9, 1999

(51) Int. Cl.[7] .................................................. B24D 11/00
(52) U.S. Cl. ........................ 451/533; 451/526; 451/539
(58) Field of Search .............................. 451/28, 60, 526, 451/527, 530, 533, 534, 539; 427/99, 376.7, 376.8, 377; 51/309; 228/121

(56) References Cited

U.S. PATENT DOCUMENTS

| | | |
|---|---|---|
| 2,216,728 | 10/1940 | Benner et al. . |
| 2,820,746 * | 1/1958 | Keeleric . |
| 3,916,584 | 11/1975 | Howard et al. . |
| 4,047,902 | 9/1977 | Wiand . |
| 4,082,640 | 4/1978 | Haack . |
| 4,547,998 | 10/1985 | Kajiyama . |
| 4,609,581 | 9/1986 | Ott . |
| 4,652,275 | 3/1987 | Bloecher et al. . |
| 4,776,862 | 10/1988 | Wiand . |
| 4,863,573 | 9/1989 | Moore et al. . |
| 4,908,046 | 3/1990 | Wiand . |
| 4,931,069 | 6/1990 | Wiand . |
| 4,945,686 | 8/1990 | Wiand . |
| 4,968,326 | 11/1990 | Wiand . |
| 5,022,895 | 6/1991 | Wiand . |
| 5,106,392 | 4/1992 | Slutz et al. . |
| 5,106,394 | 4/1992 | Bramson . |
| 5,127,197 | 7/1992 | Brukvoort et al. . |
| 5,131,924 | 7/1992 | Wiand . |
| 5,133,782 | 7/1992 | Wiand . |
| 5,136,818 | 8/1992 | Bramson . |
| 5,152,917 | 10/1992 | Pieper et al. . |
| 5,174,795 | 12/1992 | Wiand . |
| 5,197,249 | 3/1993 | Wiand . |
| 5,203,881 | 4/1993 | Wiand . |
| 5,209,760 | 5/1993 | Wiand . |
| 5,219,462 | 6/1993 | Bruxvoort et al. . |
| 5,232,470 | 8/1993 | Wiand . |
| 5,247,765 | 9/1993 | Quintana . |
| 5,251,802 * | 10/1993 | Bruxvoort et al. .................. 228/121 |
| 5,254,194 | 10/1993 | Ott et al. . |
| 5,281,244 | 1/1994 | Wiand . |
| 5,318,604 | 6/1994 | Gorsuch et al. . |
| 5,368,619 | 11/1994 | Culler . |
| 5,435,816 | 7/1995 | Spurgeon et al. . |
| 5,454,751 | 10/1995 | Wiand . |
| 5,505,747 | 4/1996 | Chesley et al. . |
| 5,549,962 | 8/1996 | Holmes et al. . |
| 5,607,488 | 3/1997 | Wiand . |
| 5,651,729 | 7/1997 | Benguerel . |
| 5,656,045 | 8/1997 | Wiand . |
| 5,681,217 | 10/1997 | Hoopman et al. . |
| 5,981,362 | 11/1999 | Wiand . |

FOREIGN PATENT DOCUMENTS

| | | |
|---|---|---|
| 627281 A3 | 12/1994 | (EP) . |
| 0 615 816 B1 | 6/1998 | (EP) . |
| 760526 * | 10/1956 | (GB) . |
| 2 326 166 A | 12/1998 | (GB) . |
| 59 110537 | 6/1984 | (JP) . |
| WO 95/19242 A1 | 7/1995 | (WO) . |
| WO 98/50201 | 11/1998 | (WO) . |
| WO 99/10129 | 3/1999 | (WO) . |

* cited by examiner

Primary Examiner—Derris H. Banks
(74) Attorney, Agent, or Firm—Scott R. Pribnow

(57) ABSTRACT

An abrasive article is provided comprising a rigid backing having a first major surface and a second major surface; a plurality of ceramic abrasive composites each comprising a plurality of abrasive particles distributed throughout a porous ceramic matrix; and at least one metal coating which affixes the ceramic abrasive composites to at least one major surface of the backing.

67 Claims, 3 Drawing Sheets

METAL BOND ABRASIVE ARTICLE COMPRISING POROUS CERAMIC ABRASIVE COMPOSITES AND METHOD OF USING SAME TO ABRADE A WORKPIECE

FIELD

This invention pertains to a metal bond abrasive article comprising a backing having affixed thereto a plurality of porous ceramic abrasive composites and to methods of using same to abrade a workpiece.

BACKGROUND

The use of electrodeposited metals to secure abrasive particles to a substrate is a well established practice in the abrasive industry. Conventional electroplating of abrasives involves depositing metal onto a substrate until a desired thickness is achieved. Abrasive particles such as diamond or cubic boron nitride are then introduced into the plating bath and are deposited on the plated metal. Further electrodeposition of metal affixes the abrasive particles to the substrate. As a result of this electrodeposition process a single layer of abrasive particles are affixed to the substrate by the electrodeposited metal coating.

One disadvantage associated with such abrasive articles is that the single layer of abrasive particles may be dulled, clogged with swarf and/or dislodged from the metal bond coat during an abrading process. As a result, the cutting efficiency of the abrasive article may be substantially deteriorated. A second disadvantage associated with such abrasive articles relates to the range of abrasive particles that can be utilized in this type of an abrasive article. Specifically, deposition of metal is not favored for affixing very fine grade abrasive particles (e.g., less than about 6 μm) to a substrate because the metal thickness would substantially engulf the very fine grade abrasive particles. In such instances, the metal coating itself may contact the workpiece during the abrading process which may result in uncontrolled scratching of the workpiece.

One potential application for metal bond abrasive articles is in the finishing of magnetic memory disc substrates, for example, ceramics or glass ceramic substrates. In order to produce an acceptable magnetic memory disc, the memory disc substrate must have precisely controlled dimensions and a precisely controlled surface finish. Typically, dimensioning and imparting the desired surface finish to memory disc substrates has involved a multi-step process using loose abrasive slurries. In the first step of the process, the memory disc substrates are dimensioned such that they have the desired thickness and thickness uniformity. After dimensioning, the discs may then be textured to provide the desired surface finish.

Although loose abrasive slurries are widely used in these process, loose abrasive slurries have many disadvantages associated with them. These disadvantages include, for example, the inconvenience of handling the required large volumes of the slurry, the required agitation to prevent settling of the abrasive particles and to assure a uniform concentration of abrasive particles at the polishing interface, and the need for additional equipment to prepare, handle, and dispose of (or recover and recycle) the loose abrasive slurry. Additionally, the slurry itself must be periodically analyzed to assure its quality and dispersion stability. Furthermore, pump heads, valves, feed lines, grinding laps, and other parts of the slurry supply equipment which contact the loose abrasive slurry eventually show undesirable wear. Further, the processes which use the slurry are usually very untidy because the loose abrasive slurry, which is a viscous liquid, splatters easily and is difficult to contain.

In view of the foregoing, there is a need for an abrasive article having an increased useful life over conventional metal bond abrasive articles. Preferably, such an abrasive article will be suitable in a wide range of abrasive particle grades including very fine grades and may be suitable as a replacement for loose abrasive slurries to dimension and/or texture glass ceramic memory discs.

SUMMARY

The present invention provides a metal bond abrasive article that provides a consistent, high cut rate on various workpieces, for example, memory disc substrates, while providing a very fine surface finish (e.g., 25 Å or less). The abrasive article comprises a rigid backing having a first major surface and a second major surface and a plurality of ceramic abrasive composites affixed to at least one major surface of the backing by at least one metal coating.

The ceramic abrasive composites each comprise a plurality of abrasive particles distributed throughout a porous ceramic matrix. The ceramic abrasive composites preferably erode during the abrading process thereby releasing used or dull abrasive particles from the abrasive composite and presenting fresh abrasive particles to the workpiece. In a preferred embodiment the abrasive composites comprise about 10–90 parts be weight abrasive particles, 90–10 parts by weight ceramic matrix and have a pore volume ranging from about 4%–70%. Preferably, the abrasive particles have a size ranging from about 0.05–100 μm and include diamond, cubic boron nitride, fused aluminum oxide, ceramic aluminum oxide, heated treated aluminum oxide, silicon carbide, boron carbide, alumina zirconia, iron oxide, ceria, garnet, and mixtures thereof Most preferably, the abrasive particles comprise diamond.

The ceramic abrasive composites are affixed to the backing by at least one metal coating, preferably a series of metal coatings. The metal coating(s) are preferably applied to the backing using metal electrodeposition techniques. Preferred metals for the metal coating(s) include, for example, nickel, copper, brass, bronze, steel and alloys thereof. In a preferred embodiment, the metal coating(s) have a combined thickness ranging from about 5%–50%, more preferably 10%–30% of the height of the ceramic abrasive composites in the abrasive article. Optionally, an organic size coating may be applied over the metal coating(s) and the ceramic abrasive composites. Preferred organic size coatings comprise phenolic resins, epoxy resins, aminoplast resins, urethane resins, acrylate resins isocyanurate resins, acrylated isocyanurate resins, urea-formaldehyde resins, acrylated epoxy resins, acrylated urethane resins or combinations thereof and may be dried, thermally cured or cured by exposure to radiation, for example, ultraviolet light.

Preferred backing materials for abrasive articles of the present invention are rigid and smooth and are suitable for electrodeposition (i.e., electroplating) of a metal coating. Preferred rigid backings have a modulus of rigidity of about $1 \times 10^6$ lb/in$^2$ ($7 \times 10^4$ kg/cm$^2$) or greater, more preferably about $10 \times 10^6$ lb/in$^2$ ($7 \times 10^5$ kg/cm$^2$) or greater. Examples of backing materials include, for example, metals, metal alloys, metal-matrix composites, metalized plastics or polymer matrix reinforced composites. More preferably, the backing is a bronze sheet, most preferably having a thickness ranging from about 0.3–10 mm.

The present invention also provides a method of abrading a workpiece using an abrasive article of the present invention, the method comprising the steps of:

(a) contacting a surface of a workpiece with an abrasive article of the present invention such that the ceramic abrasive composites of the abrasive article contact the surface of the workpiece;

(b) applying a liquid at an interface between the workpiece and the abrasive article; and (c) moving the workpiece and the abrasive article relative to one another such that the abrasive article abrades the surface of the workpiece to provide a surface roughness.

Preferred lubricants to be applied at the interface between the abrasive article and the workpiece include, for example, mixtures of glycerol and water, more preferably a 20% weight solution of glycerol in water. In a preferred method, the abrasive article and the workpiece are contacted at a pressure ranging from about 0.5–45 g/mm$^2$.

In another preferred method, the abrasive article is in the form of a disc having an imaginary center axis perpendicular to the backing of the abrasive article. In this method, step (c) is conducted by spinning the disc around the center axis. Optionally, the workpiece may also move relative to the abrasive article.

Abrasive articles of the present invention may provide surface roughness (Ra) of less than about 1.5 μm, more preferably less than about 1.0 μm, even more preferably less than about 100 Å and most preferably less than about 25 Å or less.

DETAILED DESCRIPTION

Figure 1:
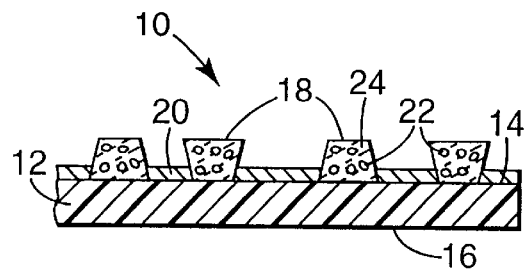
FIG. 1 is a partial cross-sectional view of an embodiment of an abrasive article of the present invention.

Referring to FIG. 1, one a cross-sectional view of an embodiment of an abrasive article 10 in accordance with the present invention is shown. Abrasive article 10 comprises backing 12 having first major surface 14 and second major surface 16 and a plurality of ceramic abrasive composites 18 which are bonded to the front side 14 of backing 12 by metal bond coating 20. The abrasive composites 18 comprise a plurality of abrasive particles 22 dispersed throughout a ceramic matrix 24 having a porous structure characterized by numerous pores or voids throughout (not shown).

Figure 1A:
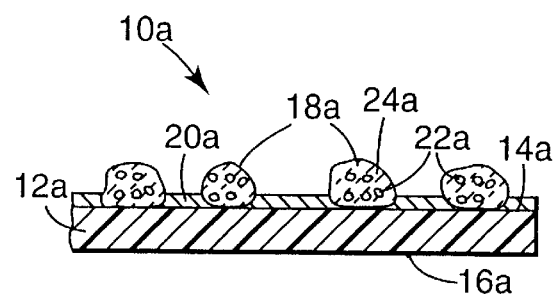
FIG. 1a a partial cross-sectional view of an embodiment of an abrasive article of the present invention.

The abrasive composites may have a precise geometric shape, for example, a truncated pyramidal shape or they may have an irregular (i.e., non-precise or random) shape. In FIG. 1, abrasive composites 18 are precisely-shaped truncated pyramids. The height of the abrasive composites typically ranges from about 30–1000 μm, preferably between about 70–700 μm. It is preferred that the height of the abrasive composites 18 is constant across the abrasive article 10, but it is possible to have abrasive composites of varying heights. The width of the abrasive composites typically ranges from about 30–1000 μm, preferably ranging from about 70–700 μm. Referring now to FIG. 1a, abrasive article 10a comprises irregularly shaped abrasive composites 18a. Abrasive composites 18a may be formed, for example, by crushing a mass of ceramic abrasive composite material. Approximate size uniformity between the irregularly shaped abrasive composites may be provided by conventional sizing techniques, for example, screening.

The abrasive composites 18 are separate and are spaced apart from one another on the backing 12. The individual abrasive composites may be arranged in a non-random pattern on the backing or they may be randomly arranged. It is preferred that the adjacent abrasive composites be separated from one another by backing or land area 26. This separation allows, in part, fluid medium (e.g., lubricant) to freely flow between the abrasive composites during a "wet" grinding process. This free flow of the fluid medium tends to contribute to a better cut rate and surface finish during grinding. Typically between about 25–75%, preferably about 30–70%, of the surface area of the backing 12 is covered with ceramic abrasive composites. In abrasive articles of the present invention, it may be desirable to increase the coverage (i.e., area density) of ceramic abrasive composites on the backing in order to increase the cut rate of the abrasive article.

Figure 2:
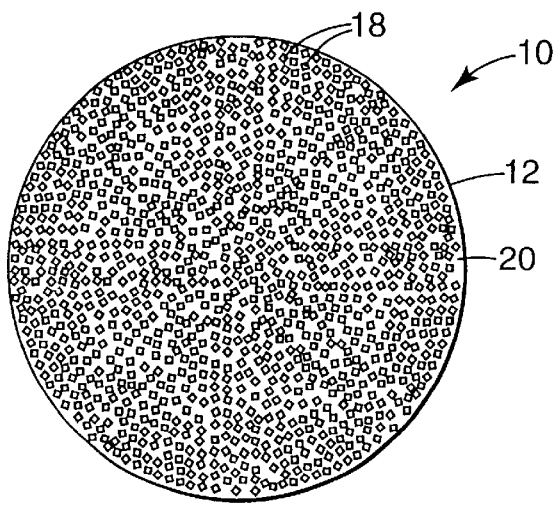
FIG. 2 is a top view of the abrasive article of FIG. 1.

FIG. 2 is a top view of abrasive article 10, showing ceramic abrasive composites 18 on backing 12. In FIG. 2 the entire major surface 14 of backing 12 (exclusive of any land area between the composites) is covered by composites 18 which are randomly positioned over the major surface 14 of backing 12.

Figure 3:
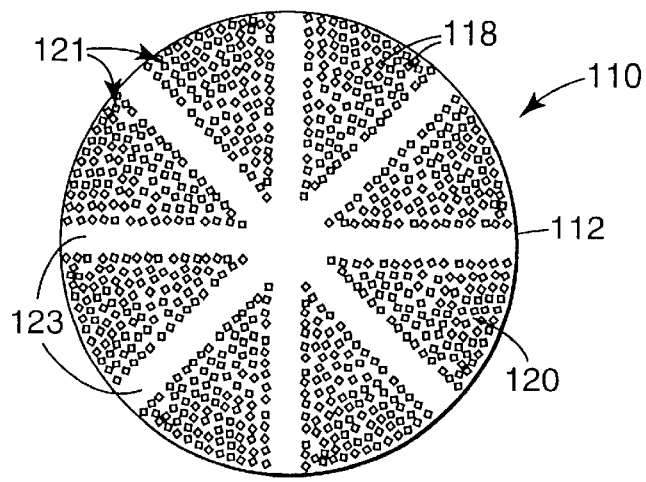
FIG. 3 is a top view of an embodiment of an abrasive article of the present invention.

Referring now to FIG. 3 a top view of an alternate embodiment of an abrasive article of the present invention is shown. In this embodiment abrasive article 110 comprises abrasive composites 118 bonded to backing 112 by metal bond coating 120. In this embodiment, the abrasive composites 118 are randomly positioned within coated areas 121 on backing 112. In this embodiment, coated areas 121 have a triangular or pie shape. Interposed between coated areas 121 are uncoated areas 123. It is to be understood that the coated and uncoated areas may have any desired shape, for example, pie shaped, circular, triangular, hexagonal, square, rectangular, pentagonal and the like. The shape of the coated and uncoated areas of the abrasive article may also be designed, for example, to provide a disc shaped abrasive article which has a constant coated area measured over the circumference at a given radius.

An abrasive article of the present invention having coated and uncoated regions may also be produced by "tiling" a major surface of a backing with several smaller abrasive articles of the present invention, for example, those shown in FIG. 2 and/or FIG. 3, while leaving a space between at least some of the adjacent abrasive articles. The abrasive article tiles may be attached to the backing by mechanical attachment or adhesive attachment, for example, an epoxy adhesive. Flexible backings may be preferred in this embodiment to allow the abrasive article to conform, for example, to a curved workpiece. Mosaic polishing pads are reported in WO 98/50201 (Roberts et al.), the disclosure of which is incorporated herein by reference.

Figure 4:
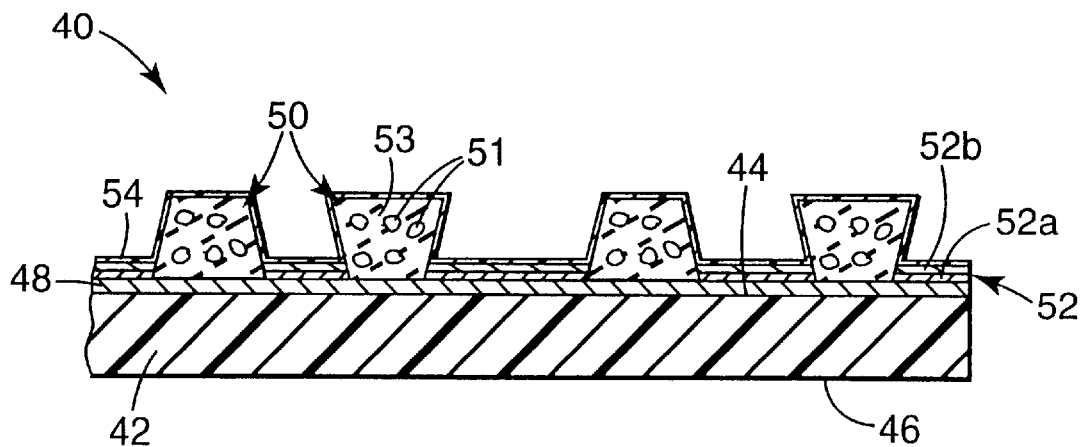
FIG. 4 is a partial cross-sectional view of an embodiment of an abrasive article of the present invention.

Referring now to FIG. 4 a cross-sectional view of an alternate embodiment of an abrasive article the present invention is shown. Abrasive article 40 comprises rigid backing 42, having first major surface 44 and second major surface 46. In this embodiment, a metal preshoot coating 48 has been applied over first major surface 44 of backing 42. Metal preshoot coating 48 may be applied to backing 42, for example, to increase the adhesion of subsequently applied coatings. Metal preshoot coating 48 typically comprises a metal or metal alloy and preferably comprises a metal or metal alloy which is compatible with the backing and the subsequently applied metal bond coating. Abrasive article 40 further comprises a plurality of ceramic abrasive composites 50 which are secured to the backing by metal coating 52. Ceramic abrasive composites 50 comprise a plurality of abrasive particles 51 distributed throughout a porous ceramic matrix 53. Metal coating 52 may be provided as a single layer or as a series of sequentially applied layers. In FIG. 4, metal coating 52 comprises first metal coating 52a and second metal coating 52b. The individual layers 52a and 52b making up metal coating 52 may comprise the same metal or metal alloy or different metals or metal alloys. In this embodiment, organic size coating 54 is applied over the metal coating 52 and ceramic abrasive composites 50. Organic size coat 54 is typically a thermoplastic resin, for example, a phenolic resin and functions to increase the strength of the ceramic abrasive composites 50.

Figure 5:
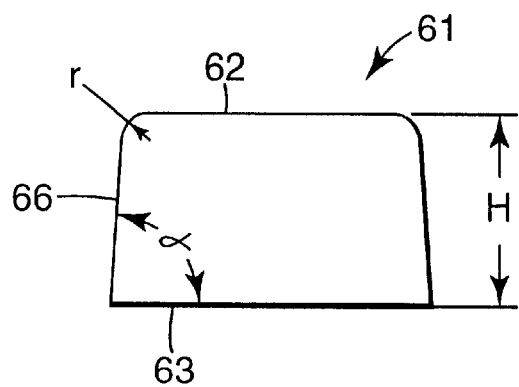
FIG. 5 is a cross-sectional-view detailing the shape of an abrasive composite.

In some embodiments, it may be desirable for the ceramic abrasive composites to be of a slightly tapered shape, for example a truncated pyramid or truncated cone. FIG. 5 shows ceramic abrasive composite 61 having an internal angle α, between base 63 and side wall 66 which defines the taper of composite 61. Angle α may be between 90° (i.e., there is no taper to the composite) and about 45°. Preferably angle α is between 75°–89.9°, more preferably between 80°–89.7°, and even more preferably between 80°–87°. It is believed that a tapered composite may aid in the controlled break-down of the abrasive composite 61 during use. A taper also aids in removal of the composite from the tooling used for molding the composite. Also in FIG. 5 is shown radius r, which is the internal radius of the corner where side wall 66 meets top surface 62. It may be preferred to have a slightly rounded or radiused corner because a rounded corner is easier to thoroughly fill with material and remove from the tooling. Also shown in FIG. 5 is height H of the ceramic abrasive composite 61 which is measured from the base 61 to top surface 62.

Backing Materials:

Backing materials serve to provide a substrate for attachment of the ceramic abrasive composites. Preferred backings are capable of being plated, preferably electroplated, with metal and are preferably rigid and smooth. As used herein, the term "smooth" describes a backing in which the magnitude of the surface texture or imperfections are small relative to the size of the abrasive composites which are adhered to the backing. As used herein the term "rigid" describes a backing material that is at least self-supporting, that is, does not substantially deform under its own weight. Suitable rigid backings function to fix the relative position and orientation of the ceramic abrasive composites relative to each other and relative to the workpiece during the abrading process. By rigid, it is not meant that the backing material is absolutely inflexible. Rigid backings may, for example, be deformed or bent under an applied load but offer very low compressibility. Preferred rigid backings comprise materials having a modulus of rigidity of about $1 \times 10^6$ lb/in$^2$ ($7 \times 10^4$ kg/cm$^2$) or greater, more preferably about $10 \times 10^6$ lb/in$^2$ ($7 \times 10^5$ kg/cm$^2$) or greater. By way of example, the modulus of rigidity for polymers ranges from about $7 \times 10^5$ lb/in$^2$ ($4.9 \times 10^4$ kg/cm$^2$) for low density polyethylene to about $1 \times 10^6$ lb/in$^2$ ($7 \times 10^4$ kg/cm$^2$) for phenolic. The modulus of rigidity for metals ranges from about $9.9 \times 10^6$ lb/in$^2$ ($6.96 \times 10^5$ kg/cm$^2$) for aluminum to about $30 \times 10^6$ lb/in$^2$ ($2.1 \times 10^6$ kg/cm$^2$) for steel. Preferred brass backings have a modulus of rigidity of about $13 \times 10^6$ lb/in$^2$ ($9.14 \times 10^5$ kg/cm$^2$) to about $16 \times 10^6$ lb/in$^2$ ($1.13 \times 10^6$ kg/cm$^2$).

When adhered to the backing, the ceramic abrasive composites project above the backing thereby creating relief between adjacent abrasive composites. This relief between adjacent abrasive composites creates pathways for the flow of liquid and/or the movement of swarf through the abrasive coating between the backing and the workpiece. Suitable platable backing materials include, for example, metals, metal alloys, metal-matrix composites, or polymer matrix reinforced composites. Preferably, the backing is a metal sheet, having a thickness ranging from about 0.3–10 mm, most preferably a bronze sheet having a thickness ranging from about 0.3–10 mm.

Abrasive Composites:

Abrasive articles of the present invention include a plurality of porous ceramic abrasive composites. The porous ceramic abrasive composites comprise individual abrasive particles dispersed in a porous ceramic matrix. The abrasive composites may also comprise optional additives such as fillers, coupling agents, surfactants, foam suppressors and the like. The amounts of these materials are selected to provide the properties desired. As used herein the term "ceramic matrix" includes ceramics, glass-ceramics and glasses. These materials generally fall within the same category when considering atomic structure. The bonding of the adjacent atoms is the result of process of electron transfer or electron sharing. Alternatively, weaker bonds as a result of attraction of positive and negative charge known as secondary bond can exist. Crystalline ceramics, glass and glass ceramics have ionic and covalent bonding. Ionic bonding is achieved as a result of electron transfer from one atom to another. Covalent bonding is the result of sharing valence electrons and is highly directional. By way of comparison, the primary bond in metals is known as a metallic bond and involves non-directional sharing of electrons. Polymers are the result of covalent and secondary bond.

Crystalline ceramics can be subdivided into silica based silicates (such as fireclay, mullite, porcelain, and Portland cement), non-silicate oxides (e.g., alumna, magnesia, MgAl$_2$O$_4$, and zirconia) and non-oxide ceramics (e.g., carbides, nitrides and graphite).

Non-crystalline glasses are comparable in composition with crystalline ceramics. As a result of specific processing techniques, these materials do not have the long range order crystalline ceramics do. Glass-ceramics are the result of controlled heat-treatment to produce over 90% crystalline phase or phases with the remaining non-crystalline phase filling the grain boundaries. Glass ceramics combine the advantage of both ceramics and glass and offer great mechanical and physical properties.

Preferred ceramic matrixes comprise glasses comprising metal oxides, for example, aluminum oxide, boron oxide, silicon oxide, magnesium oxide, sodium oxide, manganese oxide, zinc oxide and mixtures thereof. A preferred ceramic matrix is alumina-borosilicate glass comprising Si$_2$O, B$_2$O$_3$ and Al$_2$O$_3$. A preferred alumina-borosilicate glass comprises about 18% B$_2$O$_3$, 8.5% Al$_2$O$_3$, 2.8% BaO, 1.1% CaO, 2.1% Na$_2$O, 1.0% Li$_2$O with the balance being Si$_2$O. Such an alumina-borosilicate glass is commercially available from Specialty Glass Incorporated, Oldsmar Florida having a particle size of less than about 45 mm.

As used herein the term "porous" is used to describe the structure of the ceramic matrix which is characterized by having pores or voids distributed throughout its mass. The pores may be open to the external surface of the composite or sealed. Pores in the ceramic matrix are believed to aid in the controlled breakdown of the ceramic abrasive composites leading to a release of used (i.e., dull) abrasive particles from the composites. The pores may also increase the performance (e.g., cut rate and surface finish) of the abrasive article by providing a path for the removal of swarf and used abrasive particles from the interface between the abrasive article and the workpiece. Typically, the voids comprise from about 4%–70% of the volume of the composite, preferably comprising from about 5%–60% volume of the composite and most preferably comprising from about 6%–60% volume of the composite. A porous ceramic matrix may be formed by techniques well known in the art, for example, by controlled firing of a ceramic matrix precursor or by the inclusion of pore forming agents, for example, glass bubbles, in the ceramic matrix precursor.

Generally, the average size of the ceramic abrasive composites is at least about 3 times the average size of the abrasive particles used in the composites. Abrasive particles useful in the invention preferably have an average particle size about 0.05–200 µm, more preferably about 0.1–120 µm, and even more preferably about 0.15–100 µm. The desired abrasive particle size may be selected, for example, to provide a desired cut rate and/or desired surface roughness on a workpiece. Occasionally, abrasive particle sizes are reported as "mesh" or "grade", both of which are commonly known abrasive particle sizing methods. It is preferred that the abrasive particles have a Mohs hardness of at least 8, more preferably at least 9. Suitable abrasive particles include, for example, diamond, cubic boron nitride, fused aluminum oxide, ceramic aluminum oxide, heated treated aluminum oxide, silicon carbide, boron carbide, alumina zirconia, iron oxide, ceria, garnet, and combinations thereof. Preferably, the abrasive particles are diamond. Diamond abrasive particles may be natural or synthetically made diamond and may be considered "resin bond diamonds", "saw blade grade diamonds", or "metal bond diamonds". The single diamonds may have a blocky shape with distinct facets associated with them or alternatively, an irregular shape. These single diamond particles may be monocrystalline or alternatively polycrystalline such as diamond commercially available under the trade designation "Mypolex" from Mypodiamond Inc. The single diamond particles may contain a surface coating such as a metal coating (nickel, aluminum, copper or the like), an inorganic coating (for example, silica), or an organic coating. The ceramic abrasive composites may also contain a blend of more than one type of abrasive particles. For example, diamond abrasive particles may be advantageously mixed with a second, softer type of abrasive particles. In such instance, the second abrasive particles will preferably have a smaller average particle size than the diamond abrasive particles.

The abrasive composites may comprise about 10–90 parts by weight abrasive particles and 90–10 parts by weight ceramic matrix, where the ceramic matrix includes any fillers and/or other additives other than the abrasive particles. Due to the expense associated with diamond abrasive particles, it is preferred that the abrasive composites comprise about 15–85 parts by weight abrasive particles and about 85–15 parts by weight ceramic matrix. More preferably, the abrasive composites comprises about 20–80 parts by weight abrasive particles and about 80–20 parts by weight ceramic matrix, and even more preferably the abrasive composites comprise about 25–75 parts by weight abrasive particles and about 75–25 parts by weight ceramic matrix.

The ceramic abrasive composites may be precisely-shaped or irregularly (i.e., non-precisely-shaped). If irregularly shaped, the abrasive composites will typically be graded according to size in order to provide relatively uniform abrasive composite size on a given abrasive article. The ceramic abrasive composites preferably have a precise geometric shape. Initially, it is preferred that the abrasive particles do not protrude beyond the surface of the ceramic abrasive composite. As the abrasive article is being used to abrade a workpiece, the ceramic matrix breaks down to reveal new abrasive particles. The abrasive composite shape may be any shape and may be selected from among a number of geometric shapes, for example, cubic, block-like, cylindrical, prismatic, pyramidal, truncated pyramidal, conical, truncated conical, spherical, cross or post-like with a top surface which is flat. Another shape is hemispherical and is further described in U.S. Pat. No. 5,681,217. The resulting abrasive article may have a mixture of different abrasive composite shapes and sizes, however, it is generally preferred that abrasive composites having the same shape and size be used on a given abrasive article. It is foreseen that the cross section shape of the base may be different than the top surface. For example, the base of the abrasive composite could be square while the top surface is circular. Generally, it is preferred that the abrasive composites have approximately the same size in all dimensions, for example, a cube.

The ceramic abrasive composites are typically made by mixing together a temporary binder, a ceramic matrix precursor, abrasive particles, and a sufficient amount of a solvent, typically water, to wet the ingredients so to make a moldable slurry. The moldable slurry is then placed into a suitable mold, air-dried, and the hardened abrasive composite precursors are removed. After removal from the mold, the composite precursors may then be separated into individual composites using a screen. Finally, the composite precursors are fired, typically in an oxidizing atmosphere (e.g., air), to produce the porous ceramic abrasive composites.

Figure 6:
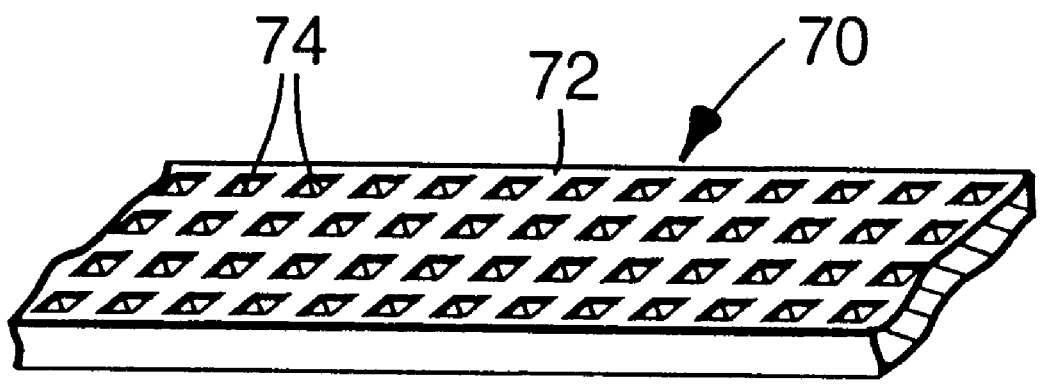
FIG. 6 is a prespective view of a segment of a production tool or mold used to form ceramic abrasive composites.

One method of producing precisely shaped abrasive composites uses a production tool or mold containing at least one cavity, preferably a plurality of cavities. Referring to FIG. 6, mold 70 has generally planar surface 72 and a plurality of cavities 74. Mold 70 can be made from a rigid material (e.g., metal) or form a flexible material such as a polymer film. The mold may be in the form of a belt, sheet, continuous sheet or web, coating roll (e.g., rotogravure roll), sleeve mounted on a coating roll, or die and may be composed of metal, including a nickel-plated surface, metal alloys, ceramic, or polymer. Further information on production tools, their production, materials, etc. may be found in U.S. Pat. Nos. 5,152,917 and 5,435,816 and EP 0 615 816 A, the disclosures of which are incorporated herein by reference.

The cavities 74 are responsible for generating the shape of the ceramic abrasive composites and have a specified three-dimensional shape which is generally the inverse shape and size of the desired abrasive composite shape. The cavities may have any geometric shape such as a cylinder, dome, pyramid, cube, truncated pyramid, prism, cone, truncated cone, or any shape having a top surface cross-section being a triangle, square, circle, rectangle, hexagon, octagon, or the like. The dimensions and shape of the cavities are selected to achieve the desired abrasive composite size and shape, taking into account shrinkage that occurs during the drying process.

The slurry may be coated into the cavities of the mold by any conventional technique such as die coating, vacuum die coating, spraying, roll coating, transfer coating, knife coating, and the like. If the mold comprises cavities that either have either flat tops or relatively straight side walls, then it may be preferred to use a vacuum during coating to minimize any air entrapment. A scraper or leveler bar can be used to force the slurry into the cavities of the mole. The portion of the slurry that does not enter the cavities can be removed from the mold and recycled.

Optionally, a release coating may be applied to the surface of mold 70 including the surfaces of cavities 74 prior to introduction of the slurry into the cavities. The function of the release coating is to allow ease of removal of the dried slurry from the mold. Typical materials used to form release coatings include low surface energy materials such as silicones and fluorochemicals.

After the slurry has been introduced into the cavities of the mold, the next step is remove at least a portion of the volatile component from the slurry. Preferably, the volatile component is removed by evaporation, for example, at room temperature, elevated temperature or a combination thereof. Elevated temperatures typically range from about 40–300° C. High drying rates should be avoided to prevent undesirable cracking in the resulting abrasive composite particles. A sufficient amount of the volatile component must be removed from the slurry such that it retains its precise shape upon removal from the mold.

Next, the abrasive composite precursors are removed from the cavities of the mold. Shrinkage of the slurry during the drying process may allow for removal by gravity from the mold. External means may be employed to aid removal of the abrasive composite precursors from the mold. Examples of such external means include ultrasonically driven vibrating devices which are placed in contact with the mold and which vibrate the mold to loosen the particle precursors. Suitable ultrasonic devices are commercially available from Branson Ultrasonic Instruments, Danbury CT under the trade designation "BRANSON 902R".

After removal from the mold, the resulting abrasive composite precursors are then fired to burn off the temporary binder and to convert the ceramic matrix precursor into a porous ceramic matrix. Typically, the temporary binder is burned off at a temperature ranging from about 350–550° C. for a period of time ranging from about 1–3 hours. Preferably, the temperature is ramped at a rate of about 2° C./minute from about room temperature to about 450° C. and is then held at about 450° C. for about 1.5 hours in order to burn off the temporary binder. After burning off the temporary binder, the abrasive composite precursors are then fired to convert the ceramic matrix precursor to a ceramic. Firing typically takes place by heating the abrasive composite precursors to a temperature ranging from about 600–950° C. for time periods ranging from about 1–3 hours. At lower firing temperatures (e.g., less than about 750° C.) an oxidizing atmosphere may be preferred. At higher firing temperatures (e.g., greater than about 750° C.) an inert atmosphere (e.g., nitrogen) may be preferred. The length of time for firing depends upon various factors, however, a time period of about 1 hour per 200 grams of abrasive composite precursors to be fired is typically sufficient. Preferably, the firing step is conducted in a continuous process. In such a process, the temporary binder is first burned off, followed by a ramping of the temperature up to the desired firing temperature. Firing converts the ceramic matrix precursor into a porous ceramic matrix. Following firing, the porous ceramic abrasive composite particles are cooled to room temperature.

It is to be understood that the present invention is not limited by the technique used to form the ceramic abrasive composites. For example, shaped particles may be formed by extruding a high viscosity slurry through a shaped die followed by cutting the particles to length. Such a technique is reported, for example in European Patent Application 0 615 816 A (Broberg).

It is also within the scope of the present invention to use irregularly (i.e., non-precisely) shaped ceramic abrasive composites. Non-precisely shaped ceramic abrasive composites may be produced, for example, by firing a mass of slurry and then pulverizing the resulting mass of ceramic abrasive composite to form particles. The particles may then be size graded using techniques known in the art, for example, screening, to yield the desired size distribution of irregularly shaped ceramic abrasive composites.

Metal Bond Coatings:

In abrasive articles of the present invention the abrasive composites are affixed to the backing by one or more metal coatings. The metal coatings are preferably applied to the backing by an electroplating process. Suitable metals for electroplating include, for example, nickel, copper, copper alloys (e.g., brass or bronze), steel and alloys thereof. In some embodiments it may be desirable to apply a series of metal bond coatings (e.g., a preshoot coating, make coating and size coating) to the abrasive article.

The preferred electroplating technique for applying metal coating(s) is carried out using the following steps. First, a conductive backing is submerged in an electroplating solution and is connected to a power source. The electroplating solution contains ions of the metal to be electroplated. For example, when nickel is chosen, the electroplating solution may be a solution of nickel sulphate or nickel sulphamate. The power source is also connected to a rod or block of the metal to be electrodeposited which is at least partially submerged in the electroplating solution. Electroplating of the metal is conducted by applying a potential difference between the backing and the rod or block of metal. This causes the metal ions present in the electroplating solution to deposit on the backing. In order to affix the ceramic abrasive composites to the backing, the abrasive composites are positioned on the backing followed by electrodeposition of a metal coating or series of metal coatings.

In a preferred embodiment, a thin "preshoot" coating is applied to the backing prior to the introduction of the ceramic abrasive composites. A preferred electroplating solution for the preshoot coating is nickel sulphate. After application of the preshoot, the next step is to apply the ceramic abrasive composites and to affix the composites to the backing using a metal coating or series of coatings. To accomplish this, ceramic abrasive composites are added to the electroplating solution. Sufficient composites are added to the electroplating solution to provide the desired area density of ceramic abrasive composites on the backing. Typically, about 25–75% of the coated surface area of the backing is covered with ceramic abrasive composites, more preferably 30–70% of the coated surface area. Preferably, the electroplating solution is stirred to provide a uniform coating of ceramic abrasive composites on the backing. The composites sink through the electroplating solution and land on the backing. After landing on the backing, metal is electroplated over the backing between the ceramic abrasive composites thereby forming a metal coating which affixes the ceramic abrasive composites to the backing. Preferably, the metal coating is made of nickel and is applied using a nickel sulphamate solution. Optionally, a second metal coating may be applied over the first metal coating. The second coating may be the same metal as the first coating or it may be a different metal. Preferably, the coatings comprise nickel metal and are applied using an electroplating solution of nickel sulphate.

Optionally, a mask may be placed over the backing to prevent ceramic abrasive composites from adhering to certain portions of the backing. Such a technique is reported in U.S. Pat. No. 4,047,902 (Wiand), the disclosure of which is incorporated herein by reference. In this way, a patterned abrasive coating having discrete portions of the backing free of ceramic abrasive composites may be formed.

The combined thickness of the metal coating(s) typically ranges from about 1–200 $\mu$m and is typically about 5%–50%, preferably from about 10%–30% of the average height of the ceramic abrasive composites used in the abrasive article. As used herein the height of the ceramic abrasive composites is measured from the base of the composite (i.e., side resting on the backing) to the top surface of the composite and, for a given composite, is dependent upon the orientation of the composite relative to the backing. By way of example, for an abrasive article having ceramic abrasive composites with a height of 300 $\mu$m, the metal coating(s) will typically have a combined thickness ranging from about 15–150 $\mu$m, preferably from about 30–90 $\mu$m. In this way, the ceramic abrasive composites protrude above the metal bond coating(s) such that during typical abrading processes the outer metal bond coating does not contact the surface of the workpiece. It is believed that this feature may help to prevent uncontrolled scratching of the workpiece which may result if the outer metal coating contacts the workpiece during the abrading process.

Organic Size Coating

Abrasive articles of the present invention may also optionally include an organic size coating which is applied over the ceramic abrasive composites and the metal coatings. The organic size coatings may be described generally as organic resins or polymers and may optionally include one or more fillers, one or more wetting agent, one or more grinding aids. The organic size coating is preferably applied over the abrasive composites and metal coating(s) and functions to increase the strength of the abrasive composites and/or the strength of the bond of the abrasive composites to the backing material. Suitable organic size coatings include thermosetting resins, for example, phenolic resins, epoxy resins, aminoplast resins, urethane resins, acrylate resins, isocyanurate resin, acrylated isocyanurate resin, urea-formaldehyde resin, acrylated epoxy resin, acrylated urethane resin or a combination thereof. These coating may be provided as solutions in an organic solvent or water or as 100% solids. The organic size coating may be applied using any conventional coating technique including, for example, roll coating, spraying, brushing or transfer coating. Typical organic size coatings are thermally cured or dried, however, resins which may be cured by exposure to radiation (e.g., ultraviolet light) are also within the scope of the present invention. The coating weight of the organic size coating typically ranges from about 0.2–0.8 g/cm$^2$, more preferably ranging from about 0.3–0.7 g/cm$^2$.

The organic size coating may further comprise optional additives, such as, surface modification additives, coupling agents, fillers, expanding agents, fibers, antistatic agents, curing agents, suspending agents, photosensitizers, lubricants, wetting agents, surfactants, pigments, dyes, UV stabilizers, and anti-oxidants. The amounts of these materials included in the abrasive article are selected to provide the desired properties.

Examples of coupling agents include silanes, titanates, and zircoaluminates. The organic size coating may contain anywhere from about 0–30%, preferably between 0.1–25% by weight coupling agent. Examples of commercially available coupling agents include "Al 74" and "Al230", commercially available from OSi Specialties, Danbury, Conn. Still another example of a commercial coupling agent is an isopropyl triisosteroyl titanate, commercially available from Kenrich Petrochemicals, Bayonne, N.J., under the trade designation "KR-TTS".

The organic size coating may further comprise a filler. A filler is a particulate material and generally has an average particle size range between 0.1–50 $\mu$m, typically between 1–30 $\mu$m. Examples of useful fillers for this invention include: metal carbonates (such as calcium carbonate - chalk, calcite, marl, travertine, marble, and limestone; calcium magnesium carbonate, sodium carbonate, and magnesium carbonate), silica (such as quartz, glass beads, glass bubbles, and glass fibers), silicates (such as talc, clays—montmorillonite; feldspar, mica, calcium silicate, calcium metasilicate, sodium aluminosilicate, sodium silicate, lithium silicate, and hydrous and anhydrous potassium silicate), metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide—lime; aluminum oxide, cerium oxide, tin oxide, stannic oxide; titanium dioxide) and metal sulfites (such as calcium sulfite), thermoplastic particles (polycarbonate, polyetherimide, polyester, polyethylene, polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles), and the like. The filler may also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metal fillers include, tin, lead, bismuth, cobalt, antimony, cadmium, iron titanium. Other miscellaneous fillers include sulfur, organic sulfur compounds, graphite, and metallic sulfides. The organic size coating typically comprises about 40–60 weight percent filler, more preferably comprising about 45–60 weight percent filler and most preferably comprising about 50–60 weight percent filler. Preferred fillers include calcium metasilicate, white aluminum oxide, calcium carbonate, silica, cerium oxide and combinations thereof. A particularly preferred filler combination is calcium metasilicate and white aluminum oxide.

An example of a suspending agent is an amorphous silica particle having a surface area less than 150 meters square/gram, commercially available from DeGussa Corp., Ridgefield Park, N.J., under the trade designation "OX-50". The addition of the suspending agent may lower the overall viscosity of the abrasive slurry. The use of suspending agents is further described in U.S. Pat. No. 5,368,619.

The abrasive article may be converted into any desired shape or form depending upon the desired configuration for abrading the workpiece. A typical shape is circular disc having a diameter of about 8 inches (20.3 cm). Converting may be accomplished by slitting, die cutting, laser cutting, waterjet cutting or any suitable means.

Method of Abrading a Workpiece

The abrasive articles of the invention used in grinding workpieces, for example ceramic, glass-ceramic and glass workpieces, surprisingly remove large quantities of material yet provide very smooth surfaces in relatively short periods of time. For example, abrasive articles of the present invention may provide surface roughness values (Ra) of about 1.5 µm or less, more preferably 1.0 µm or less, even more preferably 100 Å or less, and most preferably 25 Å or less. Ra is a common measure of surface finish or roughness used in the abrasives industry. Generally, the lower the Ra value, the smoother the surface finish. Ra is defined as the sum of the arithmetic average of the absolute value of the profile deviation from a reference centerline. Ra (surface roughness) may be measured using a profilometer, for example, known under the trade designation "TAYLOR-HOBSON SURTRONIC 3" from Rank Taylor Hobson, Leicester, England. Although not wishing to be bound by theory, it is believed that the fine surface finish (i.e., low Ra) provided by abrasive articles of the present invention may be attributable to the high degree of swarf removal provided by the recesses between adjacent abrasive composites and provided by the pores in the ceramic abrasive composites themselves. The fine surface finish provided by abrasive articles of the present invention may also be due to the spatial relationship between the ceramic abrasive composites and the metal coating(s) which minimizes, preferably eliminates, contact between the metal coating and the workpiece during the abrading process.

During abrading, the abrasive article moves relative to the workpiece and is forced downward onto the workpiece, preferably at a force ranging from about 0.5–45 g/mm$^2$, more preferably from about 0.7–40 g/mm$^2$. If the downward force is too high, then the abrasive article may not refine the scratch depth and in some instances may increase the scratch depth. Also, the abrasive article may wear excessively if the down force is too high. Conversely, if the downward force is too low, the abrasive article may not effectively remove material from the workpiece. In some applications, the workpiece may be forced downward onto the abrasive article.

As stated, the workpiece or the abrasive article or both may move relative to the other during the grinding step. This movement may be a rotary motion, a random motion, or linear motion. Rotary motion may be generated by attaching an abrasive article to a rotary tool. The workpiece and abrasive article may rotate in the same direction or opposite directions, but if in the same direction, at different rotational speeds. In a preferred method, the abrasive article is in the form of a circular disc and is rotated around its center axis. For machines, operating rpm may range up to about 30000 rpm, preferably from about 10 rpm to about 25000 rpm, and more preferably from about 20 rpm to about 20000 rpm, depending on the abrasive article. A random orbital motion may be generated by a random orbital tool, and linear motion may be generated by a continuous abrasive belt. The relative movement between the workpiece and the abrasive article may also depend on the dimensions of the workpiece. If the workpiece is relatively large, it may be preferred to move the abrasive article during grinding while the workpiece is held stationary.

The preferred method of grinding or polishing the workpiece is a "wet" abrading process using a liquid or lubricant. The lubricant has several advantages associated with it. For example, abrading in the presence of a lubricant inhibits heat build up during abrading and removes the swarf away from the interface between the abrasive article and the workpiece. "Swarf" is the term used to describe the actual debris that is abraded away by the abrasive article. In some instances, the swarf may damage the surface of the workpiece being abraded. Thus it is desirable to remove the swarf from the interface. Abrading in the presence of a lubricant may also results in a finer finish on the workpiece surface.

Suitable lubricants include water-based solutions comprising one or more of the following: amines, mineral oil, kerosene, mineral spirits, water-soluble emulsions of oils, polyethylenimine, ethylene glycol, monoethanolamine, diethanolamine, triethanolamine, propylene glycol, amine borate, boric acid, amine carboxylate, pine oil, indoles, thioamine salt, amides, hexahydro-1,3,5-triethyltriazine, carboxylic acids, sodium 2-mercaptobenzothiazole, isopropanolamine, triethylenediamine tetraacetic acid, propylene glycol methyl ether, benzotriazole, sodium 2-pyridinethiol-l-oxide, and hexylene glycol. Lubricants may also include corrosion inhibitors, fungi inhibitors, stabilizers, surfactants and/or emulsifiers.

Commercially available lubricants include, for example, those known under the trade designations BUFF-O-MINT (commercially available from Ameratron Products), CHALLENGE 300HT or 605HT (commercially aviailable from Intersurface Dynamics), CIMTECH GL2015, CIMTECH CX-417 and CIMTECH 100 (CIMTECH is commercially available from Cincinnati Milacron), DIAMOND KOOL or HEAVY DUTY (commercially available from Rhodes), K-40 (commercially available from LOH Optical), QUAKER 101 (commercially available from Quaker State), SYNTILO 9930 (commercially available from Castrol Industrial), TIM HM (commercially available from Master Chemical), LONG-LIFE 20/20 (commercially available from NCH Corp), BLASECUT 883 (commercially available from Blaser Swisslube), ICF-31NF (commercially available from Du Bois), SPECTRA-COOL (commercially available from Salem), SURCOOL K-11 (commercially available from Texas Ntal), AFG-T (commercially available from Noritake), SAFETY-COOL 130 (commercially available from Castrol Industrial), and RUSTLICK (commercially available from Devoon).

In some applications, the abrasive article is bonded to a support pad. The support pad may be made from a foam (e.g., polyurethane or rubber foam), rubber, elastomer, or any other suitable material. The hardness and/or compressibility of the support pad material is selected to provide the desired grinding characteristics (cut rate, abrasive article product life, and workpiece surface finish).

The support pad may have a continuous and relatively flat surface that the abrasive article is secured to. Alternatively, the support pad may have a discontinuous surface in which there exists a series of raised portions and lower portions in which the abrasive article is secured to. In the case of a discontinuous surface, the abrasive article may be secured to only the raised portions. Conversely, an abrasive article may be secured to more than one raised portion, such that the entire abrasive article is not fully supported. The discontinuous surface in the support pad may be selected to provide the desired fluid flow of the lubricant and the desired grinding characteristics (cut rate, abrasive article product life, and workpiece surface finish).

The support pad may have any shape such as circular, rectangular, square, oval, and the like. The support pad may range in size (longest dimension) from about 5 cm to 1,500 cm.

The abrasive article may be secured to the support pad by a pressure sensitive adhesive, hook and loop attachment, a mechanical attachment or a permanent adhesive. The attachment should be such that the abrasive article is firmly secured to the support pad and survive the rigors of glass grinding (wet environment, heat generation, and pressures).

Representative examples of pressure sensitive adhesives suitable for this invention include latex crepe, rosin, acrylic polymers, and copolymers; for example, polybutylacrylate, polyacrylate ester, vinyl ethers; for example, polyvinyl n-butyl ether, alkyd adhesives, rubber adhesives; for example, natural rubber, synthetic rubber, chlorinated rubber, and mixtures thereof.

Alternatively, the abrasive article may contain a hook and loop type attachment system to secure the abrasive article to the support pad. The loop fabric may be on the back side of the coated abrasive with hooks on the back-up pad. Alternatively, the hooks may be on the back side of the coated abrasive with the loops on the back-up pad. This hook and loop type attachment system is further described in U.S. Pat. Nos. 4,609,581; 5,254,194; and 5,505,747, and PCT WO 95/19242.

EXAMPLES

The following non-limiting Examples will further illustrate the invention. All parts, percentages, ratios, and the like, in the Examples are by weight, unless otherwise indicated.

Example 1

A temporary binder solution was prepared by dissolving 64 parts by weight dextrin (commercially available under the trade designation "STANDEX 230" from A. E. Stanley Mfg. Co., Decatur, Ill.) in 36 parts by weight deionized water.

A slurry comprising 108.0 g of the temporary binder solution, 120.0 g lumina-borosilicate glass comprising 18.0% $B_2O_3$, 8.5% $Al_2O_3$, 2.8% BaO, 1.1% CaO, 2.1% $Na_2O$, 2.9% $K_2O$, 1.0% $Li_2O$ and 63.6% $SiO_2$ (commercially available from Specialty Glass Inc., Oldsmar, Fla.), 120.0 g diamond abrasive particles having a nominal particle size of 6 $\mu$m (commercially available from American Boarts Crushing Inc., Boca Raton, Fla.) was thoroughly stirred with a propeller mixing blade for five minutes followed by agitation in an ultrasonic bath (Model Cole-Palmer 8852 from Cole-Palmer Instrument Co., Chicago, Ill.) for 30 minutes at a frequency setting of 47 kHz. The resulting slurry was then coated into the cavities of a polypropylene production tool and the excess slurry was removed by a doctor blade. The production tool was made according to the teachings of U.S. Pat. No. 5,152,917 (Pieper et al.). The cavities in the polypropylene production tool were in the form of truncated pyramids having a depth of 356 $\mu$m, an opening of 493 $\mu$m by 493 $\mu$m and a base of 302 $\mu$m by 302 $\mu$m. The slurry in the cavities of the production tool was air dried at room temperature for one hour followed by forced air drying at 75° C. for one hour. After drying, the dried abrasive composite precursors were urged from the production tool by contacting the back surface of the production tool with an ultrasonically driven vibrating titanium bar (commercially available from Branson Ultrasonic Instruments, Danbury Conn. under the trade designation "BRANSON 902R"). The dried precursors were then fired in a refractory sager (commercially available from Ipsen Ceramic, Pecatonica, Ill.). The firing temperature was ramped from room temperature to 450° C. at a rate of 2° C. per minute and was then held at 450° C. for 1.5 hours to burn off the temporary binder. The precursors were then heated to 720° C. at a rate of 2° C. per minute and were held at 720° C. for 1.5 hours in an air atmosphere. Following firing, the resulting porous ceramic abrasive composites were cooled to room temperature at a rate of about 2° C. per minute.

The strength of the resulting abrasive composites was measured by compression using a force gauge (Model FGV-50A from Shimpo Instruments, Lincolnwood, Ill.). The medial load to failure for the ceramic abrasive composites was about 12 lb (5.5 kg). Photomicrographs of the resulting porous ceramic abrasive composites revealed the presence of pores having a size ranging from about 1–20 $\mu$m.

A bronze backing in the shape of a disc measuring approximately 8 inches (20.3 cm) in diameter by 0.060 in (1.52 mm) thick was plated with nickel preshoot coating from a nickel sulphate bath (comprising approximately 280 grams/liter nickel sulphate, 60 grams/liter nickel chloride and 44 grams/liter boric acid) at a current density of 309 Ampere/$m^2$ for 5 minutes. The nickel coated bronze backing was then transferred to a nickel sulphamate bath (comprising approximately 475 grams/liter nickel sulphamate, 25 grams/liter nickel chloride and 33 grams/liter boric acid). While in the nickel sulphamate bath, the ceramic abrasive composites described above where introduced into the bath and were allowed to settle under the influence of gravity onto the surface of the nickel coated bronze backing. The abrasive composites were deposited in random fashion on the surface of the backing at a density of about 0.06 g/$cm^2$. The abrasive composites were affixed to the backing by electroplating a coating of nickel metal from the nickel sulphamate bath at a current density of 247 Ampere/$m^2$ for 1.5 hours.

The backing having the abrasive composites affixed thereto was then transferred to a nickel sulphate bath (comprising approximately 280 grams/liter nickel sulphate, 60 grams/liter nickel chloride and 44 grams/liter boric acid) where a second nickel coating was applied at a current density of 432 Ampere/$m^2$ for 100 minutes. All depositions were carried out at an applied voltage of 3.5 volts.

The abrasive performance of the abrasive article of Example 1 was evaluated by measuring the rate of removal (i.e., cut rate) obtained on a 3 inch (7.62 cm) by 0.5 inch (1.27 cm) float glass disc (float glass is commercially available from Brin Northwestern, Mpls, Minn. and was water-jet cut to the desired size). The abrasive article was rotated at 500 rpm with a contact pressure of 8.4 psi (5900 kg/m) on a variable speed polisher (commercially available under the trade designation "BUEHLER ECOMET" polisher from Buehler Ltd, Lake Bluff, Ill.). A lubricant comprising 20% weight glycerol (commercially available from E. M. Science, Cherry Hill, N.J.) in water was applied between the abrasive article and the workpiece at a flow rate of about 24.4 $ft^3$/min (400 cm /min). The results of this testing are summarized in Table 1.

Comparative Example A

Comparative Example A is a 6 $\mu$m metal bonded diamond disc commercially available from Minnesota Mining and Manufacturing Company, St. Paul, Minn. Comparative Example A comprises an 8 inch (20.3 cm) bronze disc having a single layer of 6 $\mu$m diamond abrasive particles affixed to the surface of the disc by an electroplated metal coating.

The abrasive performance of the abrasive article of Comparative Example A was evaluated by measuring the rate of removal (i.e., cut rate) obtained on a 3 inch (7.62 cm) by 0.5 inch (1.27 cm) float glass disc (float glass is commercially available from Brin Northwestern, Mpls, Minn. and was water-jet cut to size). The abrasive article was rotated at 500 rpm with a contact pressure of 8.4 psi (5900 kg/$m^2$) on a variable speed polisher (commercially available under the trade designation "BUEHLER ECOMET" polisher from Buehler Ltd, Lake Bluff, Ill.). A lubricant comprising 20% weight glycerol (commercially available from E. M. Science, Cherry Hill, N.J.) in water was applied between the abrasive article and the workpiece at a flow rate of about 24.4 ft³/min (400 cm³/min). The results of this testing are summarized in Table 1.

TABLE 1

|  | Example 1 | | Comparative Example A | |
| --- | --- | --- | --- | --- |
| Time (hrs) | Total Cut (g) | Cut Rate (g/min) | Total Cut (g) | Cut Rate (g/min) |
| 0.1 | 0.53 | 0.156 | 0.01 | 0.002 |
| 4.9 | 48.58 | 0.46475 | 0.01 | 0 |
| 10.2 | 119.78 | 0.15575 | 0.01 | 0 |
| 14.9 | 168.86 | 0.27775 | 0.01 | 0 |
| 19.6 | 229.92 | 0.13175 | 0.01 | 0 |
| 23.9 | 257.33 | 0.179449 | 0.01 | 0 |

Example 2

A temporary binder solution was prepared by dissolving 64 parts by weight dextrin (commercially available under the trade designation "STANDEX 230" from A. E. Stanley Mfg. Co., Decatur, Ill.) in 36 parts by weight deionized water.

A slurry comprising 81.0 g of the temporary binder solution, 120.0 g alumina-borosilicate glass comprising 18.0% $B_2O_3$, 8.5% $Al_2O_3$, 2.8% BaO, 1.1% CaO, 2.1% $Na_2O$, 2.9% $K_2O$, 1.0% $Li_2O$ and 63.6% $SiO_2$ (commercially available from Specialty Glass Inc., Oldsmar, Fla.), 60.0 g diamond abrasive particles having a nominal particle size of 74 µm (commercially available from American Boarts Crushing Inc., Boca Raton, Fla.) was thoroughly stirred with a propeller mixing blade for five minutes followed by agitation in an ultrasonic bath (Model Cole-Palmer 8852 from Cole-Palmer Instrument Co., Chicago, Ill.) for 30 minutes at a frequency setting of 47 kHz. The resulting slurry was then coated into the cavities of a polypropylene production tool and the excess slurry was removed by a doctor blade. The production tool was made according to the teachings of U.S. Pat. No. 5,152,917 (Pieper et al.). The cavities in the polypropylene production tool were in the form of truncated pyramids having a depth of 356 µm, an opening of 493 µm by 493 µm and a base of 302 µm by 302 µm. The slurry in the cavities of the production tool was air dried at room temperature for one hour followed by forced air drying at 75° C. for one hour. After drying, the dried abrasive composite precursors were urged from the production tool using an ultrasonically driven titanium bar (commercially available from Branson Ultrasonic Instruments, Danbury Conn. under the trade designation "BRANSON 902R"). The dried precursors were then fired in a refractory sager (commercially available from Ipsen Ceramic, Pecatonica, Ill.). The firing temperature was ramped from room temperature to 450° C. at a rate of 2° C. per minute and was then held at 450° C. for 1.5 hours to burn off the temporary binder. The precursors were then heated to 720° C. at a rate of 2° C. per minute and were held at 720° C. for 1.5 hours in an air atmosphere. Following firing, the resulting porous ceramic abrasive composites were cooled to room temperature at rate of about 2° C. per minute.

The strength of the resulting ceramic abrasive composites was measured by compression using a force gauge (Model FGV-50A from Shimpo Instruments, Lincolnwood, Ill.). The medial load to failure for the composites was about 12 lb (5.5 kg). Photomicrographs of the resulting porous ceramic abrasive composites revealed the presence of pores having a size ranging from about 1–20 µm.

A bronze backing in the shape of a disc measuring approximately 8 inches (20.3 cm) in diameter by 0.060 in (1.52 mm) thick was plated with nickel preshoot coating from a nickel sulphate bath (comprising approximately 280 grams/liter nickel sulphate, 60 grams/liter nickel chloride and 44 grams/liter boric acid) at a current density of 309 Ampere/m for 5 minutes. The nickel coated bronze backing was then transferred to a nickel sulphamate bath (comprising approximately 475 grams/liter nickel sulphamate, 25 grams/liter nickel chloride and 33 grams/liter boric acid). While in the nickel sulphamate bath, the ceramic abrasive composites described above where introduced into the bath and were allowed to settle under the influence of gravity onto the surface of the nickel coated bronze backing. The abrasive composites were deposited in random fashion on the surface of the backing at a density of about 0.28 g/cm². The abrasive composites were affixed to the backing by electroplating a coating of nickel metal from the nickel sulphamate bath at a current density of 247 Ampere/m² for 1.0 hours.

The backing having the abrasive composites affixed thereto was then transferred to a nickel sulphate bath (comprising approximately 280 grams/liter nickel sulphate, 60 grams/liter nickel chloride and 44 grams/liter boric acid) where a second nickel coating was applied at a current density of 308 Ampere/m² for 60 minutes. All electrodepositions were carried out at an applied voltage of 3.5 volts.

The abrasive performance of the abrasive article of Example 2 was evaluated by measuring the rate of removal (i.e., cut rate) obtained on a 3 inch (7.62 cm) by 0.5 inch (1.27 cm) float glass disc (float glass is commercially available from Brin Northwestern, Mpls, Minn. and was water-jet cut to size). The abrasive article was rotated at 500 rpm with a contact pressure of 8.4 psi (5900 kg/m²) on a variable speed polisher (commercially available under the trade designation "BUEHLER ECOMET" polisher from Buehler Ltd, Lake Bluff, Ill.). A lubricant comprising 20% weight glycerol (commercially available from E.M. Science, Cherry Hill, N.J.) in water was applied between the abrasive article and the workpiece at a flow rate of about 24.4 ft³/min (400 cm³/min). The results of this testing are summarized in Table 2.

Comparative Example B

Comparative Example B is a 74 µm metal bonded diamond disc commercially available from Minnesota Mining and Manufacturing Company, St. Paul, Minn. Comparative Example B comprises an 8 inch (20.3 cm) bronze disc having a single layer of 74 µm diamond abrasive particles affixed to the surface of the bronze disc by an electroplated metal coating.

The abrasive performance of the abrasive article of Comparative Example B was evaluated by measuring the rate of removal (i.e., cut rate) obtained on a 3 inch (7.62 cm) by 0.5 inch (1.27 cm) float glass disc (float glass is commercially available from Brin Northwestern, Mpls, Minn. and was water-jet cut to size). The abrasive article was rotated at 500 rpm with a contact pressure of 8.4 psi (5900 kg/m²) on a variable speed polisher (commercially available under the trade designation "BUEHLER ECOMET" polisher from Buehler Ltd, Lake Bluff, Ill.). A lubricant comprising 20% weight glycerol (commercially available from E.M. Science, Cherry Hill, N.J.) in water was applied between the abrasive article and the workpiece at a flow rate of about 24.4 ft³/min (400 cm³/min). The results of this testing are summarized in Table 2.

TABLE 2

| Time (min) | Total Cut (g) | |
|---|---|---|
| | Example 2 | Comparative Example B |
| 15 | 215.57 | 81.75 |
| 25.5 | 375.89 | 131.23 |
| 54 | 758.84 | 258.78 |
| 67.3 | 913.99 | 314.23 |

Ra (surface roughness) was measured using a profilometer (commercially available under the trade designation "TAYLOR-HOBSON SURTRONIC 3" from Rank Taylor Hobson, Leicester, England). Ra for the workpiece abraded by the abrasive article of Example 1 was 0.99–1.52 µm. Ra for the workpiece abraded by the abrasive article of Comparative Example A was 1.72–2.12 µm.

Example 3

A temporary binder solution was prepared by dissolving 22.5 parts by weight dextrin (commercially available under the trade designation "STANDEX 230" from A. E. Stanley Mfg. Co., Decatur, Ill.) in 67.5 parts by weight deionized water. The temporary binder solution was filtered through filter paper with the aid of an aspirator to remove coarse particulate.

A slurry comprising 90.0 g of the temporary binder solution, 90.0 g alumina-borosilicate glass comprising 18.0% $B_2O_3$, 8.5% $Al_2O_3$, 2.8% BaO, 1.1% CaO, 2.1% $Na_2O$, 2.9% $K_2O$, 1.0% $Li_2O$ and 63.6% $SiO_2$ (commercially available from Specialty Glass Inc., Oldsmar, Fla.), 30.0 g diamond abrasive particles having a nominal particle size of 0.3 µm (commercially available from American Boarts Crushing Inc., Boca Raton, Fla.), 1.2 g Cyanasol AY50 (commercially available from American Cyanamid Co., Parsippany, N.J.) and 0.4 g Dow Additive 65 (commercially available from Dow Coming, Midland, MI) was thoroughly stirred with a propeller mixing blade for five minutes followed by agitation in an ultrasonic bath (Model Cole-Palmer 8852 from Cole-Palmer Instrument Co., Chicago, Ill.) for 30 minutes at a frequency setting of 47 kHz. The resulting slurry was then coated into the cavities of a polypropylene production tool and the excess slurry was removed by a doctor blade. The production tool was made according to the teachings of U.S. Pat. No. 5,152,917 (Pieper et al.). The cavities in the polypropylene production tool were in the form of truncated pyramids having a depth of 356 µm, an opening of 493 µm by 493 µm and a base of 302 µm by 302 µm. The slurry in the cavities of the production tool was air dried at room temperature for one hour followed by forced air drying at 75° C. for one hour. After drying, the dried abrasive composite precursors were urged from the production tool using an ultrasonically driven titanium bar (commercially available from Branson Ultrasonic Instruments, Danbury Conn. under the trade designation "BRANSON 902R"). The dried precursors were then fired in a refractory sager (commercially available from Ipsen Ceramic, Pecatonica, Ill.). The firing temperature was ramped from room temperature to 400° C. at a rate of 1.5° C. per minute and was then held at 400° C. for 2.0 hours to bum off the temporary binder. The precursors were then heated to 700° C. at a rate of 1.5° C. per minute and were held at 700° C. for 1.0 hours in an air atmosphere. Following firing, the resulting porous ceramic abrasive composites were cooled to room temperature at a rate of about 2° C. per minute.

The strength of the resulting abrasive composites was measure by compression 15 using a force gauge (Model FGV-50A from Shimpo Instruments, Lincolnwood, Ill.). The medial load to failure for the composites was about 12 lb (5.5 kg). Photomicrographs of the resulting porous ceramic abrasive composites revealed the presence of pores having a size ranging from about 1–20 µm.

A bronze backing in the shape of a disc measuring approximately 8 inches (20.3 cm) in diameter by 0.060 in (1.52 mm) thick was plated with nickel preshoot coating from a nickel sulphate bath (comprising approximately 280 grams/liter nickel sulphate, 60 grams/liter nickel chloride and 44 grams/liter boric acid) at a current density of 309 Ampere/$m^2$ for 5 minutes. The nickel coated bronze backing was then transferred to a nickel sulphamate bath (comprising approximately 475 grams/liter nickel sulphamate, 25 grams/liter nickel chloride and 33 grams/liter boric acid). While in the nickel sulphamate bath, the ceramic abrasive composites described above where introduced into the bath and were allowed to settle under the influence of gravity onto the surface of the nickel coated bronze backing. The abrasive composites were deposited randomly in random fashion on the surface of the backing at a density of about 0.06 g/$cm^2$. The abrasive composites were affixed to the backing by electroplating a coating of nickel metal from the nickel sulphamate bath at a current density of 247 Ampere/$m^2$ for 1.0 hours.

The backing having the abrasive composites affixed thereto was then transferred to a nickel sulphate bath (comprising approximately 280 grams/liter nickel sulphate, 60 grams/liter nickel chloride and 44 grams/liter boric acid) where a second nickel coating was applied at a current density of 308 Ampere/$m^2$ for 60 minutes. All electrodepositions were carried out at an applied voltage of 3.5 volts.

The abrasive performance of the resulting abrasive article was evaluated by measuring the rate of removal (i.e., cut rate) on a 3 inch (7.62 cm) AlTiC ceramic disc workpiece (commercially available under the trade designation "ALTIC 310" from Minnesota Mining and Manufacturing Co., St. Paul, Minn.). The abrasive article was rotated at 500 rpm with a contact pressure of 8.4 psi (5900 kg/$m^2$) on a variable speed polisher (commercially available under the trade designation "BUEHLER ECOMET" polisher from Buehler Ltd, Lake Bluff, Ill.). A lubricant comprising 20% weight glycerol (commercially available from E.M. Science, Cherry Hill, N.J.) in water was applied between the abrasive article and the workpiece at a flow rate of about 24.4 $ft^3$/min (400 $cm^3$/min). The results of this testing are summarized in Table 3.

TABLE 3

| Time (min) | Total Cut (g) |
|---|---|
| 30 | 0.3419 |
| 60 | 0.6414 |
| 90 | 0.9101 |
| 120 | 1.133 |

Ra (surface roughness) was measured using a profilometer (commercially available as "TENCOR LONGSCAN PROFILOMETER MODEL P-2" from Tencor Instruments, Mountainview, Calif.). Ra for the workpiece abraded by the abrasive article of Example 3 was 16–21 Å.

Example 4

An abrasive article prepared as described in Example 1 was coated with an organic size coating. The organic size coating solution comprised 100 g of a resole phenolic resin (the resole phenolic was 78% solids in water and contained 0.75–1.8% free formaldehyde and 6–8% free phenol) 40 g of tap water, 0.4 g of silane coupling agent (commercially available under the trade designation "A1000" from OSi Specialties, Danbury Conn.), 0.4 g wetting agent (commercially available under the trade designation "SIL-WET L7604" from Union Carbide), 120 g of ceria polishing compound (commercially available under the trade designation "OPALINE POLISHING COMPOUND" from Rhone-Poulenc Co., France). The ingredients of the organic size coating solution were combined in a beaker and were mixed for approximately 30 minutes. The organic size coating solution was brushed over the abrasive coating of an abrasive article as described in Example 1. The abrasive article was then placed in an oven for 1.5 hours at 95° C., followed by 105° C. for 8 hours, followed by 135° C. for 3 hours, to cure the size coating. The coating weight of the organic size coating was 0.07 g/in$^2$ (0.45 g/cm$^2$).

What is claimed is:

1. An abrasive article comprising:
   a rigid backing having a first major surface and a second major surface;
   a plurality of ceramic abrasive composites wherein each of the composites comprises a plurality of abrasive particles distributed throughout a porous ceramic matrix; and
   at least one metal coating which affixes the ceramic abrasive composites to a major surface of the backing; wherein the metal coating has a thickness which is less than an average height of the ceramic abrasive composites.

2. The abrasive article of claim 1, wherein the ceramic abrasive composites have a pore volume ranging from about 5–70%.

3. The abrasive article of claim 1, wherein the abrasive particles have a Mohs hardness of 9 or greater.

4. The abrasive article of claim 1, wherein the abrasive particles are selected from the group consisting diamond, cubic boron nitride, fused aluminum oxide, ceramic aluminum oxide, heated treated aluminum oxide, silicon carbide, boron carbide, alumina zirconia, iron oxide, ceria, garnet, and mixtures thereof.

5. The abrasive article of claim 1, wherein the abrasive particles have a size ranging from about 0.05–100 μm.

6. The abrasive article of claim 1, wherein the abrasive particles comprise diamond particles having a size ranging from about 0.05–100 μm.

7. The abrasive article of claim 1 further including an organic size coating applied over the ceramic abrasive composites and the metal coating.

8. The abrasive article of claim 7, wherein the organic size coating comprises a thermosetting resin selected from the group consisting of phenolic resins, epoxy resins, aminoplast resins, urethane resins, acrylate resins, isocyanurate resin, acrylated isocyanurate resin, urea-formaldehyde resin, acrylated epoxy resin, acrylated urethane resin, and combinations thereof.

9. The abrasive article of claim 1, wherein the porous ceramic matrix comprises glass comprising metal oxides selected from the group consisting of aluminum oxide, boron oxide, silicon oxide, magnesium oxide, sodium oxide, manganese oxide, zinc oxide, and combinations thereof.

10. The abrasive article of claim 1, wherein the porous ceramic matrix comprises alumina-borosilicate glass comprising $Si_2O$, $B_2O_3$ and $Al_2O_3$.

11. The abrasive article of claim 1, wherein the backing has a modulus of rigidity of about 1×10$^6$ lb/in$^2$ or greater.

12. The abrasive article of claim 1, wherein the backing has a modulus of rigidity of about 10×10$^6$ lb/in$^2$ or greater.

13. The abrasive article of claim 1, wherein the backing comprises a metal.

14. The abrasive article of claim 13, wherein the metal backing is selected from the group consisting of aluminum, steel, nickel, copper, tin, zinc, chrome and alloys thereof.

15. The abrasive article of claim 13, wherein the metal backing has a thickness ranging from about 0.3–10 mm.

16. The abrasive article of claim 1, wherein the metal coating comprises a metal selected from the group consisting of nickel, copper, brass, bronze, steel and alloys thereof.

17. The abrasive article of claim 1, wherein the metal coating has a thickness ranging from about 1–200 μm.

18. The abrasive article of claim 1, wherein the metal coating has a thickness ranging from about 5–50% of the average height of the ceramic abrasive composites.

19. The abrasive article of claim 1, wherein the metal coating has a thickness ranging from about 10–30% of the average height of the ceramic abrasive composites.

20. The abrasive article of claim 1, wherein the metal coating is deposited on the backing using an electroplating process.

21. The abrasive article of claim 1, wherein the metal coating comprises at least two sequentially applied layers of metal.

22. The abrasive article of claim 1, wherein the ceramic abrasive composites are precisely shaped.

23. The abrasive article of claim 22, wherein the precisely shaped ceramic abrasive composites have a shape selected from the group consisting of cubic, block-like, cylindrical, prismatic, pyramidal, truncated pyramidal, conical, truncated conical, cross, hemispherical, spherical and post-like with a flat top surface.

24. The abrasive article of claim 1, wherein the ceramic abrasive composites have an average size ranging from about 30–1000 μm.

25. The abrasive article of claim 1, wherein the ceramic abrasive composites comprise about 10–90 parts by weight abrasive particles and 90–10 parts by weight ceramic matrix.

26. The abrasive article of claim 1, wherein the ceramic abrasive composites are randomly distributed on the major surface of the backing and cover about 25–75% of the major surface.

27. The abrasive article of claim 1, wherein the ceramic abrasive composites are randomly distributed on the major surface of the backing in coated areas and wherein the coated areas are separated from one another by uncoated areas wherein substantially no ceramic abrasive composites are affixed to the backing.

28. The abrasive article of claim 27, wherein the coated areas are pie-shaped, rectangular, circular, hexagonal, triangular, pentagonal, or a mixture thereof.

29. An abrasive article comprising at least two abrasive articles of claim 1 fixed to a major surface of a backing.

30. A method of abrading a workpiece comprising the steps of:
   (a) contacting a surface of a workpiece with an abrasive article of claim 1 such that the ceramic abrasive composites of the abrasive article contact the surface of the workpiece;
   (b) applying a liquid at an interface between the workpiece and the abrasive article; and
   (c) moving the workpiece and the abrasive article relative to one another such that the abrasive article abrades the surface of the workpiece to provide a surface roughness.

31. The method of claim 30, wherein the liquid comprises a mixture of glycerol and water.

32. The method of claim 30, wherein the workpiece comprises glass, glass ceramic or ceramic.

33. The method of claim 32, wherein the workpiece is float glass.

34. The method of claim 32, wherein the workpiece is AlTiC.

35. The method of claim 30, wherein the abrasive article and the workpiece are contacted at a pressure ranging from about 0.5–45 g/mm$^2$.

36. The method of claim 30, wherein the abrasive article is in the form of a circular disc having a center axis perpendicular to the disc and wherein the moving step is conducted by spinning the disc around the center axis.

37. The method of claim 30, wherein the surface roughness of the workpiece is about 1.50 μm or less.

38. The method of claim 30, wherein the surface roughness of the workpiece is about 1.00 μm or less.

39. The method of claim 30, wherein the surface roughness of the workpiece is about 100 Å or less.

40. The method of claim 30, wherein the surface roughness of the workpiece is about 25 Å or less.

41. The method of claim 30, wherein the ceramic abrasive composites have a pore volume ranging from about 5–70%.

42. The method of claim 30, wherein the abrasive particles have a Mohs hardness of 9 or greater.

43. The method of claim 30, wherein the abrasive particles are selected from the group consisting diamond, cubic boron nitride, fused aluminum oxide, ceramic aluminum oxide, heated treated aluminum oxide, silicon carbide, boron carbide, alumina zirconia, iron oxide, ceria, garnet, and mixtures thereof.

44. The method of claim 30, wherein the abrasive particles have a size ranging from about 0.05–100 μm.

45. The method of claim 30, wherein the abrasive particles comprise diamond particles having a size ranging from about 0.05–100 μm.

46. The method of claim 30, wherein the abrasive article further includes an organic size coating applied over the ceramic abrasive composites and the metal coating.

47. The method of claim 46, wherein the organic size coating comprises a thermosetting resin selected from the group consisting of phenolic resins, epoxy resins, aminoplast resins, urethane resins, acrylate resins, isocyanurate resin, acrylated isocyanurate resin, urea-formaldehyde resin, acrylated epoxy resin, acrylated urethane resin, and combinations thereof.

48. The method of claim 30, wherein the porous ceramic matrix comprises glass comprising metal oxides selected from the group consisting of aluminum oxide, boron oxide, silicon oxide, magnesium oxide, sodium oxide, manganese oxide, zinc oxide, and combinations thereof.

49. The method of claim 30, wherein the porous ceramic matrix comprises alumina-borosilicate glass comprising $Si_2O$, $B_2O_3$ and $Al_2O_3$.

50. The method of claim 30, wherein the backing has a modulus of rigidity of about 1×10$^6$ lb/in$^2$ or greater.

51. The method of claim 30, wherein the backing has a modulus of rigidity of about 10×10$^6$ lb/in$^2$ or greater.

52. The method of claim 30, wherein the backing comprises a metal.

53. The method of claim 30, wherein the metal backing is selected from the group consisting of aluminum, steel, nickel, copper, tin, zinc, chrome and alloys thereof.

54. The method of claim 30, wherein the metal backing has a thickness ranging from about 0.3–10 mm.

55. The method of claim 30, wherein the metal coating comprises a metal selected from the group consisting of nickel, copper, brass, bronze, steel and alloys thereof.

56. The method of claim 30, wherein the metal coating has a thickness ranging from about 1–200 mm.

57. The method of claim 30, wherein the metal coating has a thickness ranging from about 5–50% of the average height of the ceramic abrasive composites.

58. The method of claim 30, wherein the metal coating has a thickness ranging from about 10–30% of the average height of the ceramic abrasive composites.

59. The method of claim 30, wherein the metal coating is deposited on the backing using an electroplating process.

60. The method of claim 30, wherein the metal coating comprises at least two sequentially applied layers of metal.

61. The method of claim 30, wherein the ceramic abrasive composites are precisely shaped.

62. The method of claim 60, wherein the precisely shaped ceramic abrasive composites have a shape selected from the group consisting of cubic, block-like, cylindrical, prismatic, pyramidal, truncated pyramidal, conical, truncated conical, cross, hemispherical, spherical and post-like with a flat top surface.

63. The method of claim 30, wherein the ceramic abrasive composites have an average size ranging from about 30–1000 μm.

64. The method of claim 30, wherein the ceramic abrasive composites comprise about 10–90 parts by weight abrasive particles and 90–10 parts by weight ceramic matrix.

65. The method of claim 30, wherein the ceramic abrasive composites are randomly distributed on the major surface of the backing and cover about 25–75% of the major surface.

66. The method of claim 30, wherein the ceramic abrasive composites are randomly distributed on the major surface of the backing in coated areas and wherein the coated areas are separated from one another by uncoated areas wherein substantially no ceramic abrasive composites are affixed to the backing.

67. The method of claim 30, wherein the coated areas are pie-shaped, rectangular, circular, hexagonal, triangular, pentagonal, or a mixture thereof.

* * * * *

UNITED STATES PATENT AND TRADEMARK OFFICE
CERTIFICATE OF CORRECTION

PATENT NO. : 6,319,108 B1
DATED : November 20, 2001
INVENTOR(S) : Adefris, Negus B.

It is certified that error appears in the above-identified patent and that said Letters Patent is hereby corrected as shown below:

Column 3,
Line 32, "FIG. 1a a" should read -- FIG. 1a is a --.

Column 13,
Line 67, "results in a finer" should read -- result in a finer --.

Column 15,
Line 59, "bum" should read -- burn --.

Column 16,
Line 17, "above where introduced" should read -- above were introduced --.

Column 19,
Line 62, "bum"should read -- burn --.

Column 20,
Line 2, "measure by compression 15 using" should read -- measured by compression using --.
Line 18, "above where introduced" should read -- above were introduced --.

Column 23,
Line 29, "consisting diamond," should read -- consisting of diamond, --.

Signed and Sealed this

Twenty-ninth Day of June, 2004

JON W. DUDAS
*Acting Director of the United States Patent and Trademark Office*